United States Patent
Henn (10) Patent No.: US 9,289,845 B2
(45) Date of Patent: Mar. 22, 2016

(54) METAL DEPOSITION OF EXTERIOR MEMBERS IN OIL FIELD TUBULARS

(71) Applicant: David S. Henn, Haslet, TX (US)

(72) Inventor: David S. Henn, Haslet, TX (US)

( * ) Notice: Subject to any disclaimer, the term of this patent is extended or adjusted under 35 U.S.C. 154(b) by 542 days.

(21) Appl. No.: 13/671,052

(22) Filed: Nov. 7, 2012

(65) Prior Publication Data

US 2014/0124483 A1 May 8, 2014

(51) Int. Cl.
*B23K 9/04* (2006.01)
*B23K 15/00* (2006.01)
*B23K 26/14* (2014.01)

(52) U.S. Cl.
CPC ............ *B23K 15/0086* (2013.01); *B23K 26/14* (2013.01); *B23K 26/342* (2015.10)

(58) Field of Classification Search
CPC ............ B23K 15/0093; B23K 26/345; B23K 15/0013; B23K 15/002
See application file for complete search history.

(56) References Cited

U.S. PATENT DOCUMENTS

| | | | |
|---|---|---|---|
| 2,841,687 A | 7/1958 | Richter | |
| 3,360,846 A * | 1/1968 | Schellstede et al. | 29/447 |
| 3,405,247 A | 10/1968 | Hlivka | |
| 3,924,092 A | 12/1975 | Lessmann et al. | |
| 3,952,180 A | 4/1976 | Gnanamuthu | |
| 3,985,995 A | 10/1976 | Brandi et al. | |
| 4,228,339 A | 10/1980 | Scales et al. | |
| 4,323,756 A * | 4/1982 | Brown et al. | 219/121.66 |
| 4,842,186 A * | 6/1989 | Doyle et al. | 228/222 |
| 5,503,785 A * | 4/1996 | Crump et al. | 264/40.7 |
| 6,350,326 B1 * | 2/2002 | McCay et al. | 148/503 |
| 6,627,839 B1 * | 9/2003 | Luckowski et al. | 219/76.14 |
| 7,073,561 B1 * | 7/2006 | Henn | 164/94 |
| 8,354,608 B2 * | 1/2013 | Dave et al. | 219/73.2 |
| 8,698,041 B2 * | 4/2014 | Shin | 219/121.76 |
| 2002/0020164 A1 * | 2/2002 | Cleveland et al. | 60/39.01 |
| 2003/0150611 A1 * | 8/2003 | Buytaert | 166/241.6 |
| 2011/0030973 A1 * | 2/2011 | Jenner | 166/382 |

OTHER PUBLICATIONS

"Advances in Casing Centralization Using Spray Metal Technology" Paper No. 21979, May 3, 2011, Offshore Technology Confernce, by John Gammage.
"Drill Pipe Hard-Facing" brochure, Durum-Verschleiss Gmbh.

* cited by examiner

*Primary Examiner* — Dana Ross
*Assistant Examiner* — Renee L Miller
(74) *Attorney, Agent, or Firm* — Dan Brown Law Office; Daniel R. Brown (57) ABSTRACT

Layered metal deposition by fusion thereof onto a surface of an engineered structural member, without degrading structural performance. The net shape of an exterior member is defined, including a fusion contact area. The structural member is preheated below its maximum operating temperature. An energy beam and feedstock are directed to a feed point in the fusion area, thereby forming a molten puddle fusing the materials together. The feed point is moved relative to the structural member, thereby advancing the molten puddle of presently fed feedstock and rapidly solidifying previously fed feedstock. The energy beam power is modulated to control the size of the molten puddle so as not to exceed a predetermined depth of penetration of the fusion region into the structural member. Advancing the feed point sequentially fuses feedstock into the defined net shape on the structural member.

26 Claims, 9 Drawing Sheets

METAL DEPOSITION OF EXTERIOR MEMBERS IN OIL FIELD TUBULARS

BACKGROUND OF THE INVENTION

1. Field of the Invention

The present invention relates to near net shape fabrication using additive manufacturing techniques. More specifically, the present invention relates to adding exterior members and fitments to oilfield tubulars using energy beam and wire feedstock layered material deposition technology.

2. Description of the Related Art

The use of near net shape fabrication by layered deposition of metal is a developing technology that continues to advance through technical challenges. The inventor of the present invention also holds U.S. Pat. No. 7,073,561 for SOLID FREEFORM FABRICATION SYSTEM AND METHOD issued on Jul. 1, 2006, the disclosure of which is hereby incorporated by reference. The teachings of the '561 patent principally address solid member fabrication where the entire fabricated item is comprised of the feedstock wire that is deposited in fusion bonded layers, usually onto some type of a mold. As such, the fabricated item is made of 100% feedstock material, which has some level of uniformity and strength and other predictable parameters.

Another area of advancement in metal deposition technology is the potential use of the technology to add additional members and fitments to an existing structure. For example, in the case of oil and gas drilling and production operations, the well casing, tubing, pipes and rods used (collectively "tubulars"), often times require the attachment of exterior fixtures and other members during operation. Examples of such fitments are collars, flanges, spacers, flow vanes, bore centralizers, stop collars, scratchers, wipers, and other fitments as are known to those skilled in the art.

While adding exterior fitments may appear to be a straight-forward process, not unlike the aforementioned additive manufacturing processes, there are new technical challenges. Particularly in the situation where the existing member is a structural member, as all down-hole tubulars are, that has specific and critical engineering parameters required for its use in its intended application. For example, the structural member may have specified dimensional, strength, dynamic, wear, and operating temperature requirements and limitation. It will be appreciated that additive manufacturing requires the heating, melting and solidification of portions of such a member, and that these actions can materially alter the original engineered parameters. Thus it can be appreciated that there is a need in the art for a system and method of additive manufacturing where an original structural member having engineered parameters is not materially degraded during the deposition and layering processes.

SUMMARY OF THE INVENTION

The need in the art is addressed by the methods and systems of the present invention. The present disclosure teaches a method of layered material deposition by fusion thereof onto a surface of a structural member, which has specific engineered parameters, but to do so without degrading structural performance of the structural member. The method includes the steps of defining a net shape of an exterior member, including a fusion area on the surface of the structural member. Then, preheating the structural member about the fusion area to a temperature that is within a working temperature range parameter of the structural member, and directing an energy beam and feeding feedstock to a feed point within the fusion area, thereby forming a molten puddle fusing together feedstock material and material of the structural member. Further, moving the feed point relative to the structural member, thereby advancing the molten puddle of presently fed feedstock and rapidly solidifying previously fed feedstock within a fusion region of liquefied and solidified metal. Also, modulating power within the energy beam to control the size of the molten puddle so as not to exceed a predetermined depth of penetration of the fusion region into the structural member, while advancing the feed point, thereby sequentially fusing the feedstock, by action of the advancing molten puddle, into the defined net shape of the exterior member that is built-up upon the fusion area on the surface of the structural member.

In a specific embodiment of the foregoing method, the predetermined depth of penetration is specified so as to not materially diminish any of the engineered parameters. In another embodiment, the predetermined depth of penetration is specified to be less than an allowable surface wear depth engineered parameter.

In a specific embodiment of the foregoing method, the defining a net shape step defines the exterior member to be configured a plural fluid flow control vanes.

In a specific embodiment of the foregoing method, the directing an energy beam step is accomplished by selection of an electron beam or a laser beam. In another specific embodiment, the preheating step is accomplished using the energy beam as a heat source directed to the fusion area. In another embodiment, the preheating step is accomplished using an external induction heat source, by directing heat energy to the fusion area.

In a specific embodiment of the foregoing method further includes the step of selectively controlling the rate of feeding the feedstock to control the size of the molten puddle. In another embodiment, the method further includes the step of selectively controlling the rate of advancing the feed point relative to the structural member to control the size of the molten puddle.

In a specific embodiment of the foregoing method further includes the step of scanning the energy beam in a predetermined pattern about the feed point. In another embodiment, the predetermined pattern is elliptical pattern that scrolls as the feed point is moved relative to the structural member. In a refinement to this embodiment, the predetermined pattern overlaps the position of the feedstock, thereby pre-heating the feedstock prior to fusion. In another refinement, the predetermined pattern is slightly larger than the molten puddle, thereby additionally pre-heating the structural member. In yet another refinement, the scanning step occurs at a frequency of approximately two thousand cycles per second.

In a specific embodiment of the foregoing method further includes the step of changing to a second feedstock material during the advancing step. In another embodiment, the foregoing method further includes the steps of monitoring the temperature of the fusion area, and adjusting the power level of the energy beam in response thereto.

In a specific embodiment of the foregoing method, the advancing step is accomplished by rotating the structural member with respect to the feed point. In another embodiment, wherein the structural member is cylindrical, the advancing step is accomplished by moving the feed point radially and axially with respect to the structural member. In another embodiment, the advancing step is accomplished by moving the feed point orbitally about the structural member.

In a specific embodiment of the foregoing method further includes the step of evacuating the atmosphere within a sealed deposition chamber in which the structural member is positioned, thereby preventing oxidation of the fusion materials. In another embodiment, the foregoing method further includes the step of dispersing an inert gas in the fusion area, thereby preventing oxidation of the fusion materials.

In a specific embodiment of the foregoing method the structural member is an oilfield tubular. In a refinement to this embodiment, the exterior member is defined as a net shape that is a stop collar annularly disposed about the circumference of the tubular. In another refinement, the stop collar is comprised of plural arcuate sections with spaces therebetween, thereby enabling fluids to readily flow past the stop collar.

In a specific embodiment of the foregoing method, wherein the structural member is an oilfield tubular, the method further comprises the steps of sliding a bore centralizer onto the tubular, then depositing a first stop collar on the exterior of the tubular adjacent to a first end of the bore centralizer, and then depositing a second stop collar on the exterior of the tubular adjacent to a second end of the bore centralizer, thereby slidably and rotatably retaining the bore centralizer on the tubular between the first stop collar and the second stop collar.

In a specific embodiment of the foregoing method, wherein the structural member is an oilfield tubular, the method further includes the steps of sliding a bore centralizer onto the tubular, then fixing the bore centralizer against rotation about the longitudinal axis of the tubular, and wherein the advancing step is accomplished by rotating the tubular about its longitudinal axis, and further wherein the exterior member is an annular stop collar, and the feed point is positioned inside the length of the bore centralizer, thereby limiting lateral movement of the bore centralizer by the stop collar.

The present disclosure also teaches a system for fusing an exterior member on a surface of a structural member, which has engineered parameters, by layered material deposition, the exterior member defined by a net shape including a fusion area, and without degrading structural performance of the structural member. This system includes a means for preheating the structural member in the fusion area to a temperature that is within a working temperature range parameter of the structural member. Also, a feed mechanism that is aligned to advance a feedstock material to a feed point located within the fusion area. Also, an energy beam generator aligned to direct an energy beam to the feed point, thereby forming a molten puddle that fuses together the feedstock material and material of the structural member. Also, a support structure disposed to movably locate the feed point relative to the structural member, and that advances the molten puddle of presently fed feedstock and thereby enables rapid solidification of previously fed feedstock within a fusion region of liquid metal. Also, a power modulator that modulates the power of the energy beam to control the size of the molten puddle so as not to exceed a predetermined depth of penetration of the fusion region into the structural member. In addition, the support structure sequentially advances the feed point, thereby sequentially fusing the feedstock, by action of the advancing molten puddle, into the defined net shape of the exterior member that is built-up upon the fusion area on the surface of the structural member.

In a specific embodiment of the foregoing system, the predetermined depth of penetration of the fusion region is specified so as to not materially diminish any of the engineered parameters of the structural member. In another specific embodiment, the predetermined depth of penetration of the fusion region is specified to be less than an allowable surface wear depth engineered parameter of the structural member.

In a specific embodiment of the foregoing system, the net shape of the exterior member defines a configured that is a plural fluid flow control vanes disposed on the surface of the structural member.

In a specific embodiment of the foregoing system, the energy beam generator is selected from an electron gun and a laser. In another embodiment, the means for preheating is the energy beam generator directed to the fusion area. In another embodiment, the means for preheating is an external induction heat source that directs energy to the fusion area.

In a specific embodiment of the foregoing system, the feed mechanism selectively controls the feed rate of the feedstock to control the size of the molten puddle. In another embodiment, the support structure selectively controls the rate of advancement of the feed point relative to the structural member to control the size of the molten puddle.

In a specific embodiment of the foregoing system, the energy beam generator cyclically scans the energy beam in a predetermined pattern about the feed point. In a refinement to this embodiment, the predetermined pattern is an elliptical pattern that scrolls as the feed point is moved relative to the structural member. In another refinement, the predetermined pattern overlaps the position of the feedstock, thereby preheating the feed stock prior to fusion. In yet another refinement, the predetermined pattern is slightly larger than the molten puddle, thereby additionally pre-heating the structural member. In yet another refinement, the energy beam generator cyclically scans the energy beam at a frequency of approximately two thousand cycles per second.

In a specific embodiment of the foregoing system further includes a temperature monitor coupled to measure the temperature of the fusion area, and coupled to adjust the power level of the energy beam in response thereto. In another embodiment, the support structure advances the feed point by rotating the structural member with respect thereto. In another embodiment, where the structural member is cylindrical, the support structure advances the feed point by movement radially and axially with respect to the structural member. In another embodiment, the support structure advances the feed point by movement orbitally about the structural member.

In a specific embodiment of the foregoing system further includes a sealed deposition chamber disposed about the structural member, and a vacuum pump that evacuates the atmosphere within the sealed deposition chamber in which the structural member is positioned, thereby preventing oxidation of the fusion materials.

In a specific embodiment of the foregoing system further includes an inert gas delivery system aligned to dispense inert gas in the fusion area, thereby preventing oxidation of the fusion materials.

In a specific embodiment of the foregoing system, the structural member is an oilfield tubular. In a refinement to this embodiment, the exterior member is defined as a net shape that is an stop collar annularly disposed about the circumference of the tubular. In another refinement, the stop collar is comprised of plural arcuate sections with spaces therebetween, thereby enabling fluids to readily flow past the stop collar.

DESCRIPTION OF THE INVENTION

Illustrative embodiments and exemplary applications will now be described with reference to the accompanying drawings to disclose the advantageous teachings of the present invention.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope hereof and additional fields in which the present invention would be of significant utility.

In considering the detailed embodiments of the present invention, it will be observed that the present invention resides primarily in combinations of steps to accomplish various methods and components to form various systems. Accordingly, the system components and method steps have been represented where appropriate by conventional symbols in the drawings, showing only those specific details that are pertinent to understanding the present invention so as not to obscure the disclosure with details that will be readily apparent to those of ordinary skill in the art having the benefit of the disclosures contained herein.

In this disclosure, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises a" does not, without more constraints, preclude the existence of additional identical elements in the process, method, article, or apparatus that comprises the element.

In the oil filed services industries, there are a large variety of down-hole tubular structural members utilized. This is true for well drilling operations, hydrocarbon production operations, and well maintenance and loss prevention. Down hole tubulars include well casing, tubing strings, drill strings, pumping rods, tool shafts, service fixtures, and fluid flow management fixtures, including pumps, gas anchors, and related components. Since the cost of down-hole operations is so high, and since the risk of loss is also high, the tubular structural members are typically precision designed for their intended function, including a range of engineering parameters such as tensile strength, compressive strength, shear strength, section modulus, stress fatigue, wear, pressure extremes, temperature extremes, connections, chemical resistance, and other parameters as are known to those skilled in the art. Additionally, since modern wells run very deep, in the order of tens of thousands of feet, the tensile loads are very high, and engineers do not have a great deal of latitude to over-design the strength of such members. Cost management is also an important constraint.

In addition, it is commonplace that operators need to modify tubulars during drilling and operations. For example, external members and various fixtures are commonly added to the tubulars. There are a vast array of such fixtures, tools, and miscellaneous members that are too numerous and diverse to tabulate in this disclosure. The various tubulars include structural well casings, conductor strings, surface casings, intermediate strings, production tubing, protective casings, liners, risers, and other tubulars known to those skilled in the art. Examples of external fixtures include stop collars, bore centralizers, stabilizers, flow diverters, flow mixers, deflectors, spacers, hangers, pipe stiffeners, strengtheners, and other fixtures known to those skilled in the art. Thus, just a limited number of examples will be used. However, those skilled in the art will quickly realize that the advantageous teaching disclosed herein are applicable to a very wide range of such fixtures, attachments, and exterior members. One common example is the use of an annular collar about the exterior of a tubular, which is used to locate or limited the movement of some external device. For example, when a well casing is inserted into a raw well bore, it is necessary to pump cement into the annular cavity between the exterior of the well casing and the interior of the bore hole. A device called a bore centralizer is located on the exterior of the casing, which serves to center the casing in the borehole. This allows the cement to fully encircle the casing and results in a superior well structure. A bore centralizer is typically slid onto a section of well casing prior to that casing being lowered into the borehole. Without some means for retaining the bore centralizer along the longitudinal axis of the casing, it would be impossible to control the vertical location of the centralizer down-hole. The failure of a stop collar would damage the tubular string and require extensive repair and service work, which would be costly. Thus, a stop collar is fixed to the casing, which limits the vertical movement of the centralizer.

As noted before, the structural parameters of tubulars, including casings, are critical. This presents a challenge as to how external fixtures and members are attached to tubulars. It is generally unacceptable to drill or cut into the cross section of a tubular, because this removes material and weakens the structure. Other techniques have been utilized, such as the use of setscrews and exterior layers built upon the tubular. However, these techniques tend to result in relative weak and unreliable connections. Sets screws have only a small contact patch, and can be loosened or slid along the exterior of the tubular. Some spray metal coating are used, where a metal is melted and spayed onto the surface of the tubular to build-up a thickened region that can retain an external fixture onto the tubular. However, spay techniques are imprecise, wasteful of material, and provide a material build-up that is not uniform, and that is considerably weaker than the host material. In addition, the sintered texture of spray coatings are prone to wear and corrosions. Also, some composite resin materials have been bonded to the exterior of tubular to produce net shape fixtures required in the industry. However, resin composites can fail, particularly where the bond to the steel tubular disengages and slides away. The present invention improves upon the prior art by fusing material to the host tubular in manner that is strong, precise, efficient, and cost effective.

Figure 1:
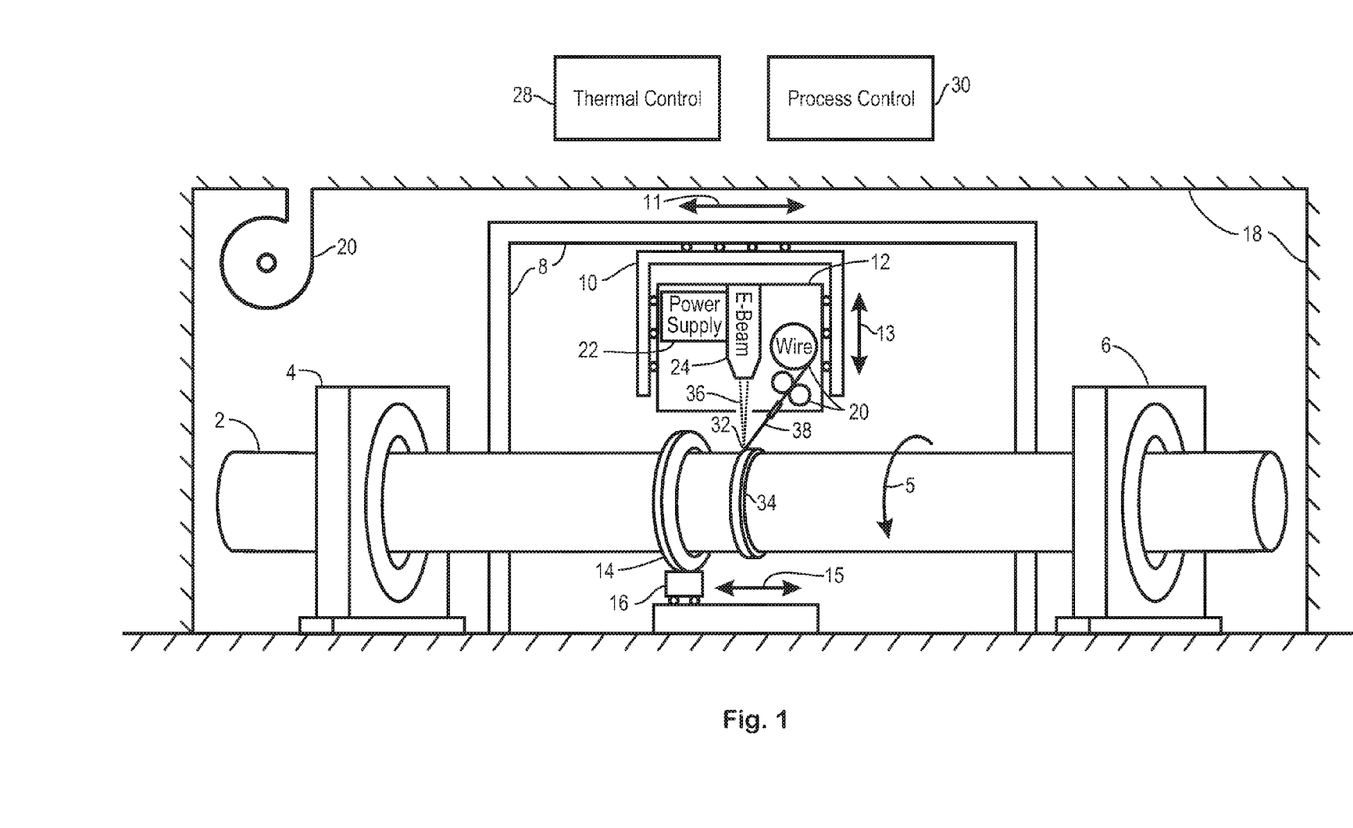
FIG. 1 is a system drawing of an electron beam deposition process applied to an oilfield tubular according to an illustrative embodiment of the present invention.

Reference is directed to FIG. 1, which is a system drawing of an electron beam deposition system and process applied to an oilfield tubular according to an illustrative embodiment of the present invention. The core technology in this illustrative embodiment is the use of an electron beam energy source 24 that is utilized to melt and fuse a wire feedstock 38 onto the exterior of a structural member, which is an oilfield tubular 2 in this embodiment. Since the electron beam 36 that is produced by the electron gun 24 is adversely affected by the presence of air molecules, the entire system is disposed in a vacuum chamber 18, and a vacuum pump 20 is used to evacuate the atmosphere from the chamber 18. A hard vacuum is preferred, however the system and process can also function in a partial vacuum. The tubular 2 is loaded into a pair of indexing rotary support fixtures 4, 6, which enable precise rotation 5 of the tubular under control of a programmable process controller 30, which may be a CNC controller, as are know in the art. Note that the electron beam 36 and the wire feedstock 38 converge at the surface of the tubular 2 at a location referred to as the feed point 32. Thus, the rotation 5 of the tubular 2 enables relative movement of the feed point 32 about the circumference of the tubular 2.

The electron beam gun 24 is mounted on a carriage 12 that also carries a power supply 22 for the electron gun and a wire feeding mechanism 20. The power supply 22 can also be located off of the carriage 12 and connected with flexible cables. The power supply 22 can also be located external of the chamber 18. The carriage 12 is movably mounted on a sub frame 10, which enables vertical movement 13 of the carriage with respect to the tubular 2. Thusly, the feed point 32 can be precisely located with respect to a radial axis of the tubular 2. The control of this motion 13 is also programmable by the process controller 30. The sub frame 10 is further movably mounted to a support frame 8, which facilitates lateral movement 11 along the longitudinal axis of the tubular 2. This motion 11 enables precise control of the feed point 32 axially with respect to the tubular 2. Control of this motion 11 is also programmable using the process controller 30. Thusly, it can be appreciated that the process controller 30 is operable to move the feed point along three axes of movement 5, 11, 13, with respect to the tubular 2. Those skilled in the art will appreciate that other three-dimensional movement and coordinate control systems could also provide the three degrees of movement of the feed point 32 with respect to the tubular 2. For example, the frame could rotate about a tubular held in a fixed position. Or, an orbital support structure that enabled three degrees of movement could also be employed. These other support structures may be preferred where the structural member is not cylindrical and thus is not readily rotatable about a central axis.

In FIG. 1, a collar 34 is in the process of being deposited and fused onto the exterior surface of the tubular 2. The contact area between the collar 34 and the surface of the tubular 2 is referred to as the fusion area, and this typically represents a small fraction of the surface area of the tubular. This is the surface area of the tubular within which metals of the feed stock 38 and metals of the tubular itself are fused together by melting and rapid solidification. There is necessarily some depth of penetration of the liquefied and fused materials, and the volume within the tubular that is fused is referred to as the fusion region. Prior to beginning the fusion process, it is useful to pre heat the tubular in the fusion area. The pre heating step can be accomplished in several different manners in the illustrative embodiments. In FIG. 1, a ring type induction heater 14 is used. The induction heater 14 is mounted on a trolley assembly 16 so that it can be moved 15 into the position of the fusion area for the pre heating operation, and them moved out of the way during the fusion process itself. Movement 15 of the trolley 16 and heater 14 are also under control of the process controller 30. In other illustrative embodiments, the energy beam can be used as the pre heat source, in a manner similar to the deposition process but without the feed wire being supplied, and with temperature monitoring to control power level settings.

Another important aspect of the illustrative embodiment of FIG. 1 is the thermal management of the pre heating and deposition processes. In the illustrative embodiment, a thermal control unit 28 is interfaced to temperature sensors (not shown), which monitor the temperature of the tubular 2 in the fusion area and also determines thermal mass and energy requirements. The temperature sensors can be contact thermocouples, non-contact infrared sensors, or other suitable sensors as are known to those skilled in the art. The thermal control unit 28 is also interface to the process controller 30. A critical aspect of the illustrative embodiment is that the size of the molten pool in the fusion region be controlled so as to limit the depth of penetration into the surface of the tubular 2. This mitigates the effect the fusion process has on the engineered parameters of the tubular 2. The pre heater 14 is energized during the pre heat operation, while the thermal control 28 monitors the temperature of the tubular 2. The pre-heat temperature is limited to the maximum operating temperature of the tubular, which may be 500 degrees Fahrenheit, for example. In any case, the tubular will be preheated to no more than the design operating temperature of the pipe, and 350 to 400° F. is desirable in this example. This is useful because the pre heating operation generally heats a far larger area and region of the tubular than is directly affected by the fusion process. By keeping the pre heat temperature below the maximum operating temperature, the process is assured to prevent degradation of the tubular's engineered parameters. Thusly, only the fusion region is directly affected by the higher power density of the energy beam 36 during the fusion process.

Furthermore, as the deposition process progresses, there are layers of material deposited as the desired exterior member, a collar 34 in this example, is built up to the specified net shape. The first layer, which is direct contact with the tubular is most critical because it established the depth of penetration of the fusion region into the surface of the tubular 2. During this first layer, the thermal controller 28 critically monitors the fusion temperature, and the power of the energy beam 32, the rate of material 38 feed, as well as the rates of movement 5, 11, 13. These parameters are controlled to manage the thermal load and depth of penetration into the fusion region. On subsequent layers, the power levels, temperatures, and rates of deposition and movement can be adjusted for productivity. Further details of this process will be more fully developed hereinafter.

Figure 2:
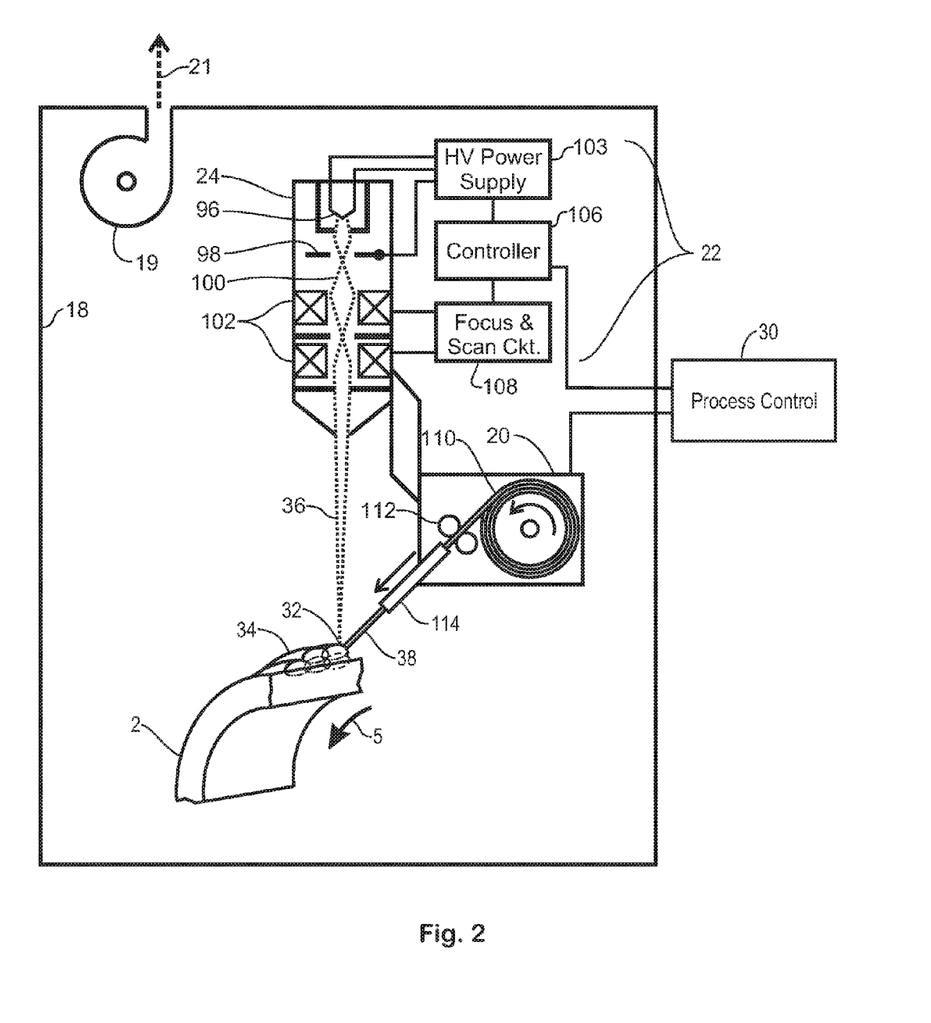
FIG. 2 is a drawing of an electron beam gun and related components performing a feed stock material deposition according to an illustrative embodiment of the present invention.

Reference is directed to FIG. 2, which is a drawing of an electron beam gun and related components performing a feed stock material deposition according to an illustrative embodiment of the present invention. An electron beam gun 24 is aligned to direct an electron beam 36 to the feed point 32. A feedstock drive mechanism 20 feeds feedstock 38 to the feed point 32, so that the feed point 32 results in a molten puddle of the feedstock material. The electron beam gun 24 consists of a cathode 96 coupled to a high voltage power supply 103, so as to emit a stream of electrons 100. The stream of electrons 100 is accelerated toward an anode plate 98, which is also coupled to the high voltage power supply 103. A hole in the anode plate 98 allows a portion of the emitted electrons to exit as an electron beam 100. Charged coils or plates 102 focus and deflect the electron beam 100, under control of focus and scan circuit 108. The electron beam 36 can be scanned about the feed point area 32 to control the footprint of the feed point and the size of the molten puddle. A programmable controller 106 coordinates the operation of the high voltage power supply 103 and the focus and scan circuits 108 so that the emitted electron beam possess the requisite energy and footprint impinging at the feed point 32. The HV power supply 103, the focus and scan circuit 108, and the electron gun controller 106 are collectively referred to as the power supply 22 in FIG. 1, and coupled to the aforementioned process controller 30.

The spatial relationship of the electron beam gun 24 and feedstock drive mechanism 20 is controlled to maintain alignment of the beam 36 and feedstock 38 at the feed point 32. The feedstock drive mechanism 20 consists of a spool of feedstock materials 110, which is fed out by drive rollers 112 through guide 114 to feed point 32. The tubular 2 is electrically coupled to the high voltage power supply 103, so that the electron beam 36 will by attracted to the feed point 32. As the material deposition begins, the feed point 32 is positioned adjacent to the fusion area of the tubular 2 so the feedstock 38 initially fuses with the tubular material 2. As each subsequent layer is built up, the upper layer 34 fuses with the next lower layer, generally referred to as the substrate that the newly deposited material 38 fuses with. The tubular 2 is rotated 5, which advanced the feed point 32 with respect to the tubular 2. The entire electron gun 24 assembly and related deposition control components are located in the deposition chamber 18, in which the atmosphere 21 is evacuated by vacuum pump 19. The following parameters can be configured and controlled to adjust operation of the deposition process. Note that some of the following apply to the laser beam energy source discussed hereinafter.

1. Accelerating voltage
2. Accelerating current
3. Beam focus
4. Puddle shape and frequency of deflection
5. Heat Ramp up/down at start and end of beads
6. Filament temperature
7. Wire feed
8. Diameter of wire
9. Speed of wire feed
10. Start/Stop Ramp up/down Parameters
11. Straightener Parameters to ensures wire is straight into the puddle
12. Wire Alignment to Puddle, manual adjustment or program control
13. Multiple wire feeders synchronization parameters for dissimilar materials
14. Mechanical System
15. NC machine or robot controls and indexers
16. Clamping systems ensure correct loading in machine
17. Speed
18. Accelerations
19. Start/Stop Ramp up/down rates
20. Precision of drive system
21. Repeatability of drive systems
22. Power of system drives (this affects inertias when handling large parts)

Figure 3:
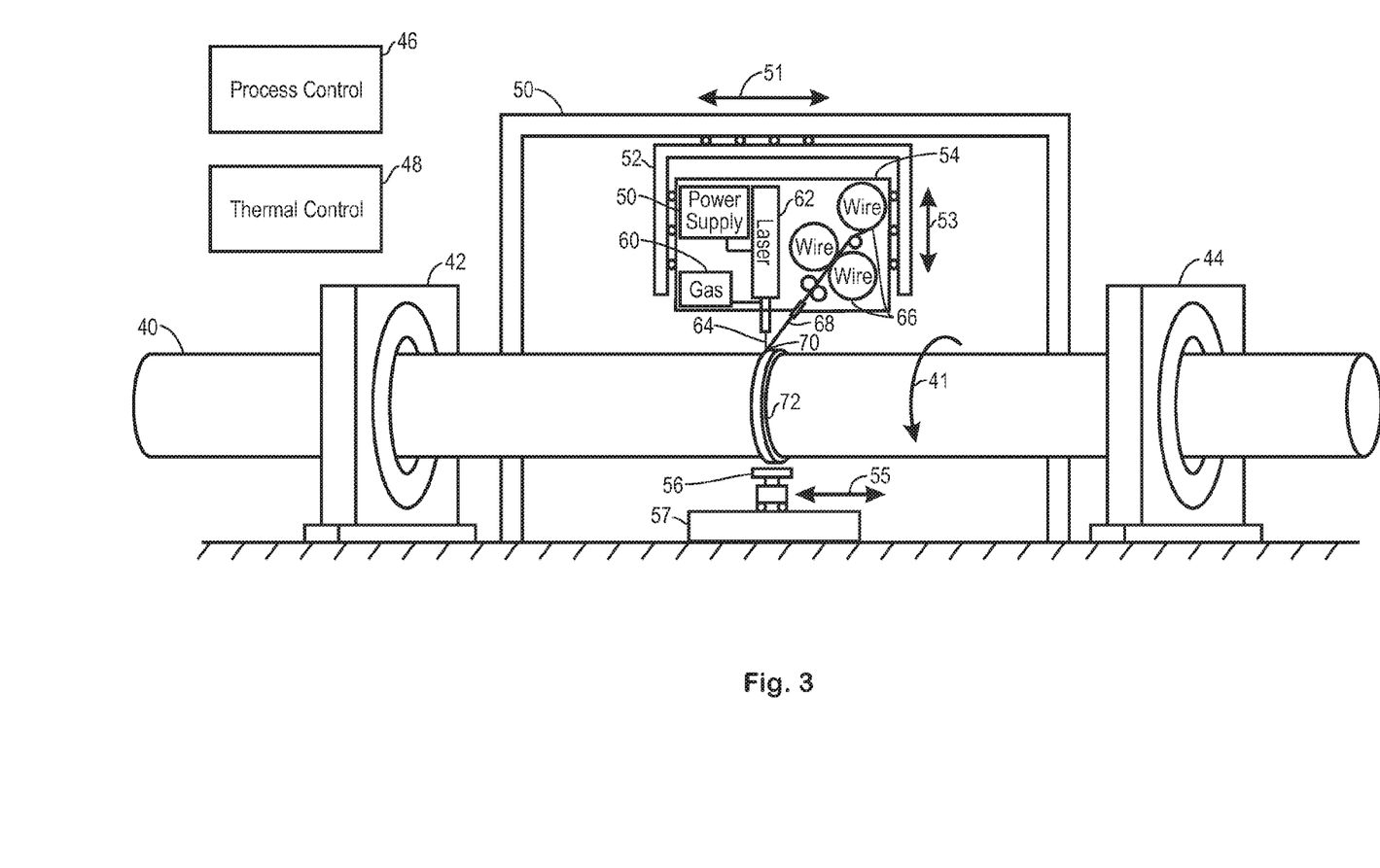
FIG. 3 is a system drawing of a laser beam deposition process to an oilfield tubular according to an illustrative embodiment of the present invention.

Reference is directed to FIG. 3, which is a system drawing of a laser beam deposition process applied to an oilfield tubular according to an illustrative embodiment of the present invention. The embodiment of FIG. 3 is generally similar to that of FIG. 1, except that a laser is employed as an energy beam in FIG. 3. In addition, a different pre heater assembly is employed, and there are multiple types of feed wire layered in the deposition process. The laser 62 is an infrared laser that is coupled to laser power supply 50. Other types of laser energy sources are also applicable, including YaG lasers, CO2 lasers, diode lasers, as well as pumped diode lasers. The laser 24 can operate in air, as opposed to the aforementioned electron beam, which was operated in a vacuum. However, the fusion process at the feed point 70 is affected by the presence of oxygen, which would result in oxidation and reduced fusion homogeneity. Therefore, the laser energy beam embodiment provides an inert gas reservoir 60, which may be argon or carbon dioxide, for example. The gas is dispensed to the feed point 70 during the deposition process to shield the fusion process from atmospheric oxygen.

The wire feed mechanism 66 is comprised of plural different alloys of feed wire. This is useful in that the built up net shape member 72 on the tubular 40 can be gradually transitioned from the native metal of the tubular to application specific alloys in the outer layers. For example, the tubular 40 may be high carbon steel. The first layer of feedstock 68 may be steel, followed by a layer of type 316 stainless steel for corrosion resistance, followed by a layer of tungsten carbide for wear resistance. The wire feed mechanism 66 is coupled to the programmable process controller 46 for management of the feed wires, deposition rates, thermal management, and so forth.

In FIG. 3, a tubular 40 is loaded into a pair of indexing rotary support fixtures 42, 44, which enable precise rotation 41 of the tubular 40 under control of a programmable process controller 46, which may be a CNC controller, as are know in the art. Note that the laser beam 64 and wire feedstock 68 converge at the surface of the tubular 40 at the feed point 70. Thus, the rotation 41 of the tubular 40 enables relative movement of the feed point 70 about the circumference of the tubular 40. The laser 62 is mounted on a carriage 54 that also carries a laser power supply 50 and the wire feeding mechanism 66, as well as the gas supply 60. The carriage 54 is movably mounted on a sub frame 52, which enables vertical movement 53 of the carriage 54 with respect to the tubular 40. Thusly, the feed point 70 can be precisely located with respect to a radial axis of the tubular 40. The control of this motion 53 is also programmable by the process controller 46. The sub frame 52 is further movably mounted to a support frame 50, which enables lateral movement 51 along the longitudinal axis of the tubular 40. This motion 51 enables precise control of the feed point 70 axially with respect to the tubular 40. Control of this motion 51 is also programmable using the process controller 46. Thusly, it can be appreciated that the process controller 46 is operable to move the feed point along three axes of movement 41, 53, 51 with respect to the tubular 40. In FIG. 3, a collar 72 is in the process of being deposited and fused onto the exterior surface of the tubular 4. The embodiment in FIG. 3 also includes a thermal controller 48, which function in like fashion to the thermal controller 28 of FIG. 1.

The heater assembly is FIG. 3 also differs from that used in FIG. 1. In FIG. 3, a 'pancake' style induction heater 56 is employed. The heater is smaller and only transfers power to a small area. As such, the tubular 40 is slowly rotated while the heater is energized, which enables the heater to warm the entire circumference of the tubular, in the are of the fusion area. A carriage 57 is employed to facilitate lateral movement 55 of the heater as required for various shapes of fusion areas.

Figure 4A:
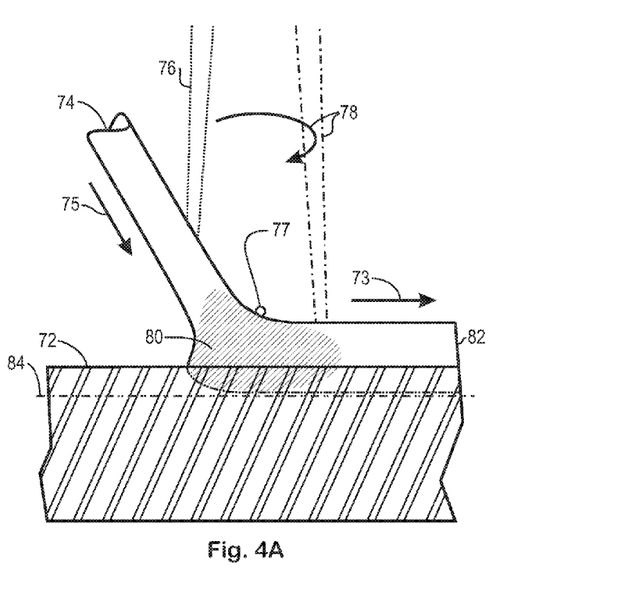
FIG. 4A, 4B, and 4C are a side view, end view, and top view drawing, respectively, of feedstock material being deposited on a structural member according to an illustrative embodiment of the present invention.
Figure 4B:
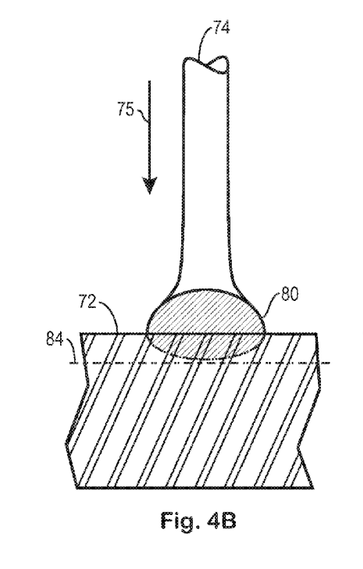
Figure 4C:
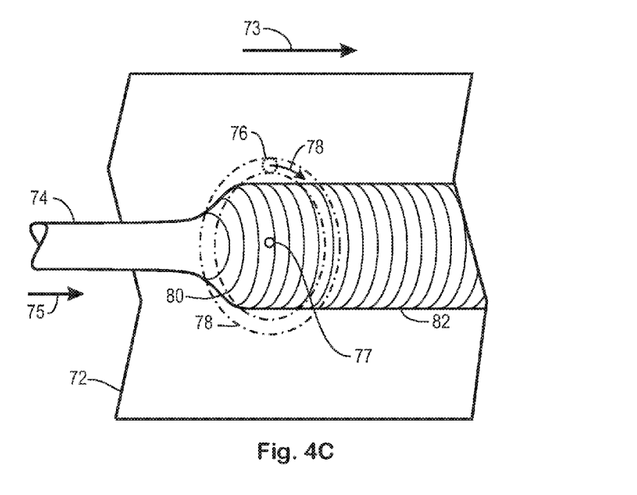

Reference is directed to FIG. 4A, 4B, and 4C, which are a side view, end view, and top view drawing, respectively, of feedstock material 74 being deposited on a structural member 72 according to an illustrative embodiment of the present invention. These drawing figures provide further details of the melting, fusing, and solidification processes of the illustrative embodiments. A structural 72 is advanced 73 relative to a feed point 77, which is approximately the geometric center of where the feed wire 74 and energy beam 76 converge. The energy beam 76 induces heat built-up in the material of the feed wire 74 and the material of the structural member 72, which results in the creation of a melted pool 80 of the materials, which thereby fuse together. As the feed point advances, the heat input is naturally removed from the currently melted pool, there is a rapidly solidification leaving the desired deposit bead 82 of new material. The volume of new material deposited 82 is provided by the continuous feed 75 of fresh feed wire 74. Note that both the feed wire 74 and the fusion area of the structural member 72 both must be heated in order for the desire fusion to occur. Thus, the energy beam 76 of the illustrative embodiment is scanned in a pattern 78 in the fusion area. This is an important aspect of the successful fusion process, which also limits the degree of alteration of the host structural member 72. In the illustrative embodiment the scan pattern 78 is elliptical, and rotates at a rate of approximately two thousand cycles per second. Lower rates and higher rates as high as forty thousand cycles per second can be useful, depending of the power of the energy beam, the diameter and material of the feed wire, that rate of movement of the structural member, that material of the structural member, and the desired rate at which new material is deposited.

The metrics of the deposition process depends on several variables, however some examples are instructive. Feed wire sizes range form 1/32" to 1/8" for readily available stock materials. Energy beam power can range from 400 Watts to 40,000 Watts. Material deposition rates can range from five to forty pounds per hour. In exemplary deposition runs, 1/16" type 316 stainless steel is deposited to produce individual beads of material that are 0.060" tall and 0.200" wide. The beam scan pattern was an ellipse measuring 0.250" wide, and 0.200" long. The energy beam diameter at the feed point was focused to 0.012" diameter. These dimensions are approximately proportional in FIG. 4. A significant aspect of this arrangement is that the scan pattern 78 overlaps to preheat both the incoming feed wire 74 and the adjacent surface of the structural member 72. This allows heat to flow into the fusion area and melted pool 80. Also note that the control of the aforementioned parameters is utilized to control the depth of the fusion region into the structural member 72. FIG. 4 shows a phantom line 84, which represents a predetermined maximum fusion region penetration depth before an engineered parameter of the structural member is known to be compromised. For example, a drill pipe oil field tubular may specify a degree of material loss through wear that is allowable before its strength parameters are compromised. By limiting the fusion depth to a lesser degree of penetration, the process is assured not to compromises the engineered parameters of the structural member. Other margins specified in the engineered parameters can also be used as fusion region guideposts.

Figure 5A:
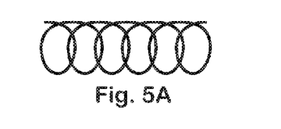
FIG. 5A, 5B. 5C, and 5D are energy beam scanning patterns according to an illustrative embodiment of the present invention.
Figure 5B:
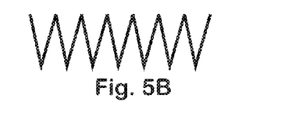
Figure 5C:
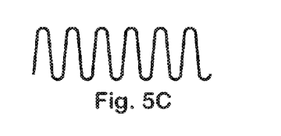
Figure 5D:
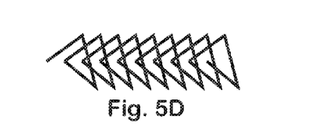

Reference is directed to FIG. 5A, 5B, 5C, and 5D, which are energy beam scanning patterns according to an illustrative embodiment of the present invention. Various energy beam scan patterns can be used, although it has been determined that the elliptical pattern has certain advantages in the forgoing illustrative embodiment. The ellipse presents a smooth and continuous movement of the energy beam about the fusion area as the structural member is advanced, and therefore does not allow the beam to dwell in any given portion of the fusion area. FIG. 5A presents an exemplary elliptical pattern. This results in an even flow of heat energy into the fusion region and also does good job of pre heating the incoming feed wire and the adjacent surface of the structural member. FIG. 5B presents a zigzag pattern, which is straightforward to program and which does a good job of evenly scanning the area of the fusion regions. However, the zigzag pattern has a significant disadvantage in that the energy beam dwells briefly at the edges of the pattern. This action results in a larger portion of the heat energy being transferred into the adjacent surface of the structural member rather than into the fusion region, and therefore poorer control of the molten puddle along the desired fusion area. FIG. 5 C represents an evolution of the zigzag pattern toward a sinusoidal pattern. This type of pattern, including a true sinusoid, improves on the poorer performance of the zigzag, however a substantially larger portion of the beam heat energy is still delivered off the sides of the desired fusion area. Finally, FIG. 5D presents a triangular pattern. This is the second best option to the elliptical pattern. Even though the triangle will result in some dwell of the beam position, that dwell can be located within the fusion region and deliver the heat energy as desired.

Figure 6A:
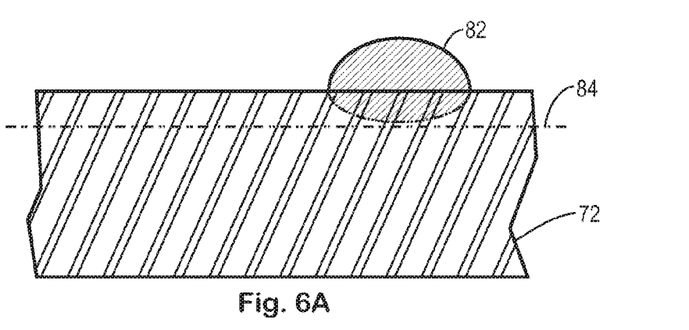
FIG. 6A, 6B, and 6C are section view drawing of a fusion deposition layering process according to an illustrative embodiment of the present invention.
Figure 6B:
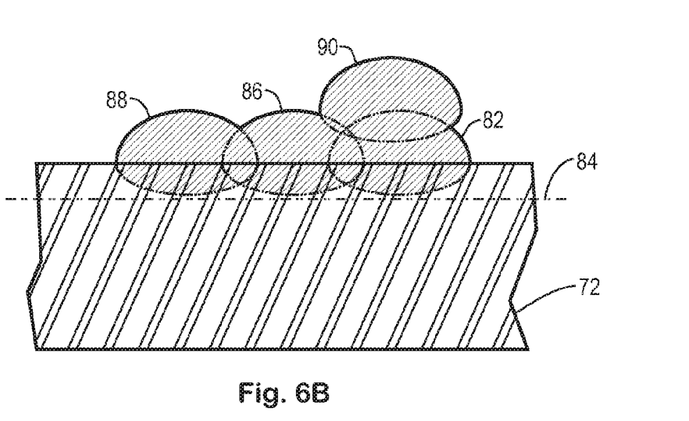
Figure 6C:
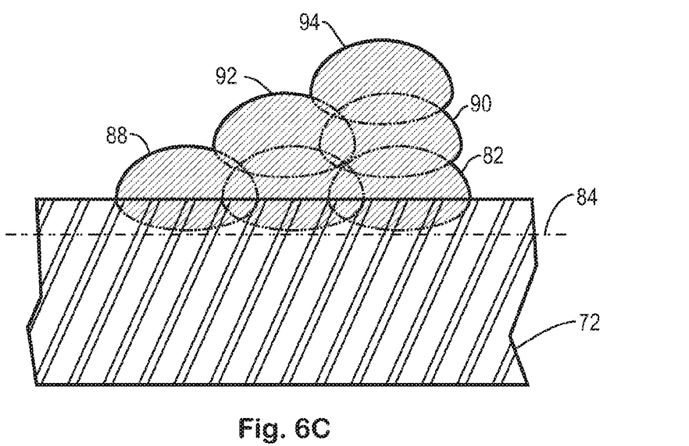

Reference is directed to FIG. 6A, 6B, and 6D, which are section view drawings of a fusion depositing layering process according to an illustrative embodiment of the present invention. These figures generally continue the teachings of FIGS. 4A, 4B, and 4C. FIG. 6A illustrates the deposition process after a single bead 82 of feed wire material has been deposited and fused onto the structural member 72. Note that phantom line 84 illustrates the predetermined maximum allowable depth of penetration of the fusion region. This depth is calculated based upon the engineered parameters of the structural member, and represents the allowable fusion depth that will not reduce the structural integrity of the structural member. All of the beads that fuse directly to the structural member 72 are referred to as the first layer, and they are critical because they require the most precise thermal control so as not to degraded the performance of the structural member. This enables the use of convention structural members for fusion of external fixtures and members where the designers can still rely on the performance of that structural member as if it were not altered in any way. An overlay between beads of approximately 50% is useful to achieve good deposition performance. FIG. 6B illustrates the process after all the first layer beads 82, 86, and 88 have been deposited plus one of the upper layer beads 90. Once all lower layer beads have been deposited, the feed point is indexed vertically (radial away from pipe) to begin second layer. Then, traverse back and forth, forming layers to the desired height for the specified near net shape. Reduce heat as needed as the deposit grows and has less of a heat sink to draw heat away from the point of deposit. FIG. 6C illustrates the complete deposition of the external member, and annular stop collar in this embodiment, which now includes beads 92 and 94. A stop collar preferably has a vertical edge aligned to engage the object that is retained by the stop collar, and a tapered edge designed form smooth fit and added strength. Note that each upper layer fuses to the lower layers to result in a homogeneous build-up near net shape of the desired external member. This process results in external members with high strength and strong interface to the host structural member.

Figure 7:
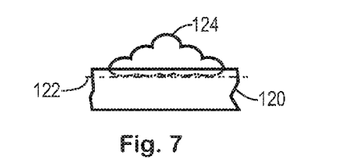
FIG. 7 is a section view drawing of a stop collar profile according to an illustrative embodiment of the present invention.
Figure 8:
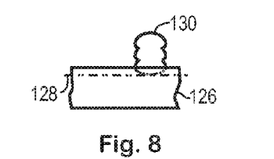
FIG. 8 is a section view drawing of a flange profile according to an illustrative embodiment of the present invention.

Reference is directed to FIG. 7, which is a section view drawing of an annular member 124 profile according to an illustrative embodiment of the present invention. There is an unlimited number of shapes and sized of external members that can be fusion deposited according to the teachings of the present invention. FIG. 7 illustrates a profile view of an annular member 124 applied to an oilfield tubular 120, which does not exceed the maximum allowable depth of penetration of the fusion region 122. This is a good annular member to use in retaining the spatial relationship between a tubule 120 and other down-hole devices, or other fixture, to an oilfield tubular. Typically, such members would be deposited and a continuous annular ring about the exterior of the tubular. However, there are certain advantages to using a broken or intermittently deposited ring, as will be more fully discussed hereinafter. Reference is directed to FIG. 8, which is a section view drawing of a flange profile according to an illustrative embodiment of the present invention. This is a profile view of a simple flange 130 that has been fusion deposited in the external surface of an oilfield tubular 126, which also does not exceed the maximum allowable depth of penetration of the fusion region 128.

Figure 9A:
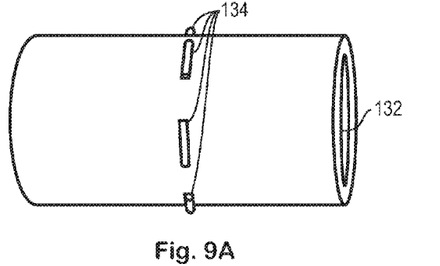
FIG. 9A and 9B are a side view and end view drawing, respectively, of a slotted stop collar on an oilfield tubular according to an illustrative embodiment of the present invention.
Figure 9B:
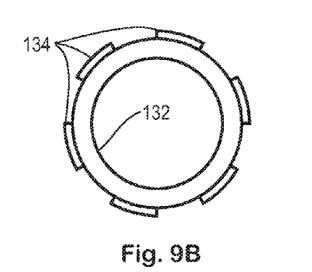

Reference is directed to FIG. 9A and 9B, which are a side view and end view drawing, respectively, of a slotted stop collar on an oilfield tubular according to an illustrative embodiment of the present invention. Oilfield tubulars provide many functions in well drilling and extraction phases of operations. One common issue is the management of fluid movement down hole. During drilling and casing installation, drilling fluids are pumped down hole and later cement is pumped into the well to seal the annular between the casing and the raw bore hole. During hydraulic fracturing, "fracking" fluids are pumped down hole. During production hydrocarbons are drawn from the formation, separated as gas and liquids, and pumped to the surface and so forth. Thus, it can be appreciated that any external member or fitment added to an exterior surface of a tubular will likely affect the flow of liquids and gases within the well structure. FIG. 9 illustrates a solution that the present invention provides in addressing these issues. An external stop collar 134 is fusion deposited to an oil field tubular 132. However, the collar 134 is segmented in to six arcuate sections that provided the requisite collar function, yet still provide gaps between these segments to enable fluids to pass by. This arrangement is not readily accomplished with spray on deposits because spray techniques are far less precise in positioning material. Prior art spray metal deposition used air as the motive force for spray. Stop ring deposit are about ¼" thick and 4" wide. They are not uniform in metal deposition, and not fully fused with casing metal.

Figure 10A:
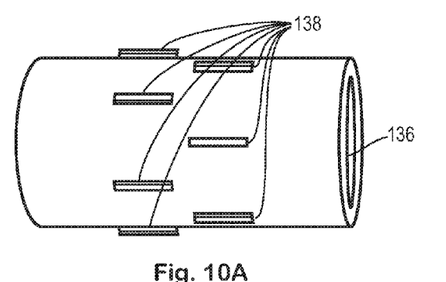
FIG. 10A and 10B are a side view and end view drawing, respectively, of a parallel ridge type stop collar on an oilfield tubular according to an illustrative embodiment of the present invention.
Figure 10B:
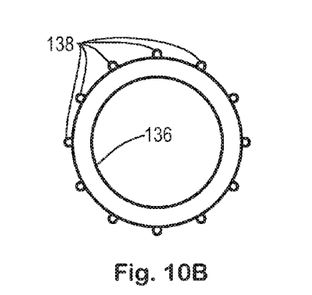

Reference is directed to FIG. 10A and 10B, which are a side view and end view drawing, respectively, of a parallel ridge type spacer 138 on an oilfield tubular 136 according to an illustrative embodiment of the present invention. Given that the teachings of the present invention enable the designer a wide latitude of near net shape fitment designs, there are a broad range of new external members that can be applied. In FIG. 10, plural parallel ridges 138 are applied laterally along the tubular 136 in a staggered arrangement, and circumferentially about it's diameter. This results in a distributed spacer between two tubulars, and can also function as a very strong collar, or centralizer, all of which provides very open flow characteristics from any fluids that may need to flow past the fixtures.

Figure 11A:
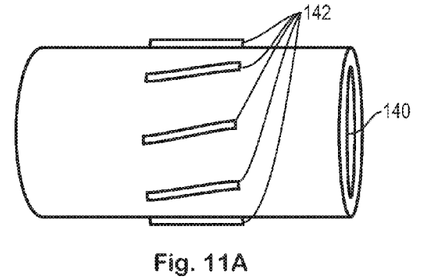
FIG. 11A and 11B are a side view and end view drawing, respectively, of a flow control vane type stop collar on an oilfield tubular according to an illustrative embodiment of the present invention.
Figure 11B:
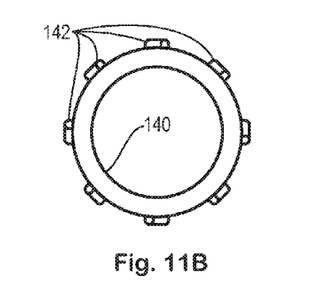

Reference is directed to FIG. 11A and 11B, which are a side view and end view drawing, respectively, of a flow control vane type stop collar 142 on an oilfield tubular 140 according to an illustrative embodiment of the present invention. This embodiment takes further advantage of the flexible design capabilities of the present invention. As the ridges 142 are fused to the tubule 140, the feed point is rotated about the central axis of the tubular to result in a scrolling flow control vane on the exterior surface. This arrangement can provide a stop collar function, a centralizer function, or other purpose while at the same time inducing rotation in the flow of fluids past the fixture. Such vanes can be utilized to apply centrifugal separation of fluids or mixing functions, both of which may be desirable in down hole fluid circulation.

Figure 12:
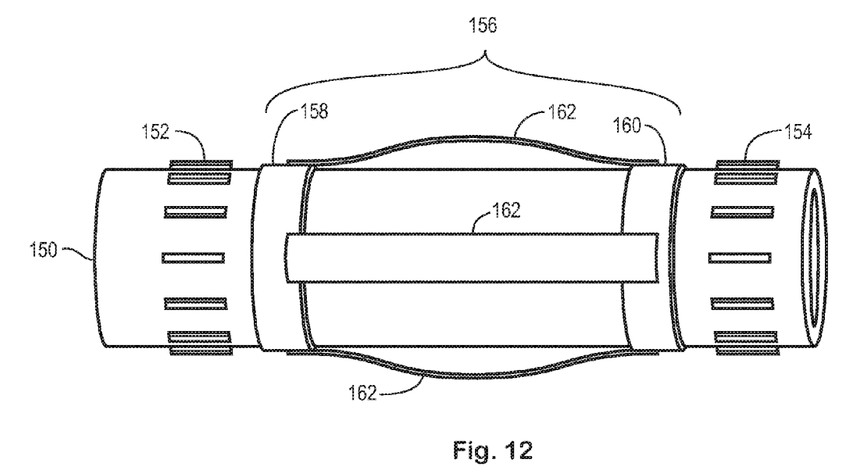
FIG. 12 is a side view drawing of a bore centralizer retained on an oilfield tubular according to an illustrative embodiment of the present invention.

Reference is directed to FIG. 12, which is a side view drawing of a bore centralizer 156 retained on an oilfield tubular 150 according to an illustrative embodiment of the present invention. A bore centralizer is a device that centers a tubular within a bore space. One use of such a device is to center well casing in a raw well bore so that cement can be pumped into the annular space therebetween. Other centralizers are positioned between different tubulars so as to center the relative location of the two, for example, between a casing and a liner. The bore centralizer 156 slides onto the exterior surface of the tubular 150. The centralizer 156 consists of two collars 158, 169 that are connected by plural spring bars 162. As the centralizer 156 is inserted into a borehole, the spring bars 162 flex to accommodate variations in the diameter of the hole. Of course, this action causes the collars 158, 160 to move laterally on the tubular 150. If the centralizer 156 were not somehow retained in place on the tubular 150, then it would not travel down the well bore to the desired depth. One way this issue is addressed is to place a stop collar above and below the centralizer to prevent it from sliding any more than is required to accommodate the flexing. Certainly, an annular collar in the form of a continuous bead of material can be applied. However, other stop collar designs have certain advantages. FIG. 12 illustrates a pair of fusion deposited stop collar fixture 152, 154, according to an illustrative embodiment of the present invention. Plural lateral members are applied laterally along the tubular 150, and circumferentially around the tubular. This is one set of fixtures above 152 and one below 154 the location of the centralizer. Note that the centralizer 156 must be in place on the tubular 150 for before the second stop collar is deposited. It is a design choice as to whether the centralizer is allowed to rotate freely during operations or whether it is fixed relative to the tubular, and both techniques are useful in the field of operation. The teachings of the present invention are well adapted to all these requirement.

Figure 13:
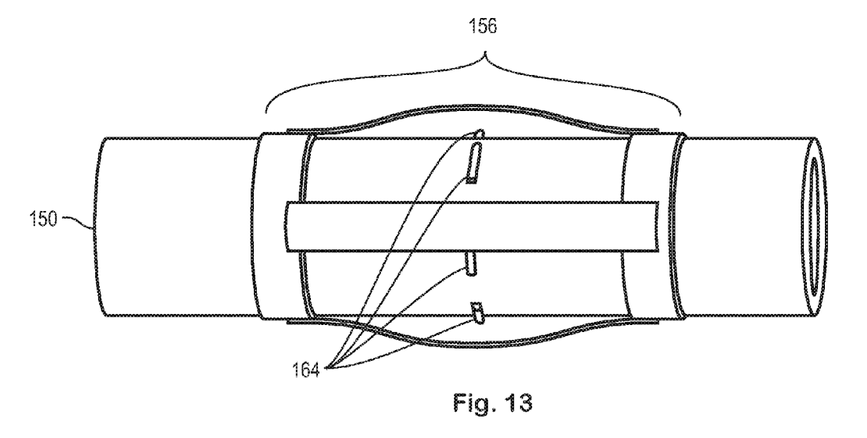
FIG. 13 is a side view drawing of a bore centralizer retained on an oilfield tubular according to an illustrative embodiment of the present invention.

Reference is directed to FIG. 13, which is a side view drawing of a bore centralizer 156 retained on an oilfield tubular 150 according to an illustrative embodiment of the present invention. This illustrative embodiment shows a unique feature of the present invention. A single stop collar can retain a centralizer on the tubular, provided that it is located between the two centralizer collars. This the systems and methods of the present invention, the centralizer 156 can be slid onto the tubular 150, and then the stop collar 164 is deposited by locating the deposition feed point between the spring arms of the centralizer 156. The centralizer 156 is held against rotation, as the tubular 150 is rotated under the feed point to advance the feed point and deposition and form the annular stop collar 165. Note that the stop collar 164 is segmented to facilitate fluid flow.

Figure 14:
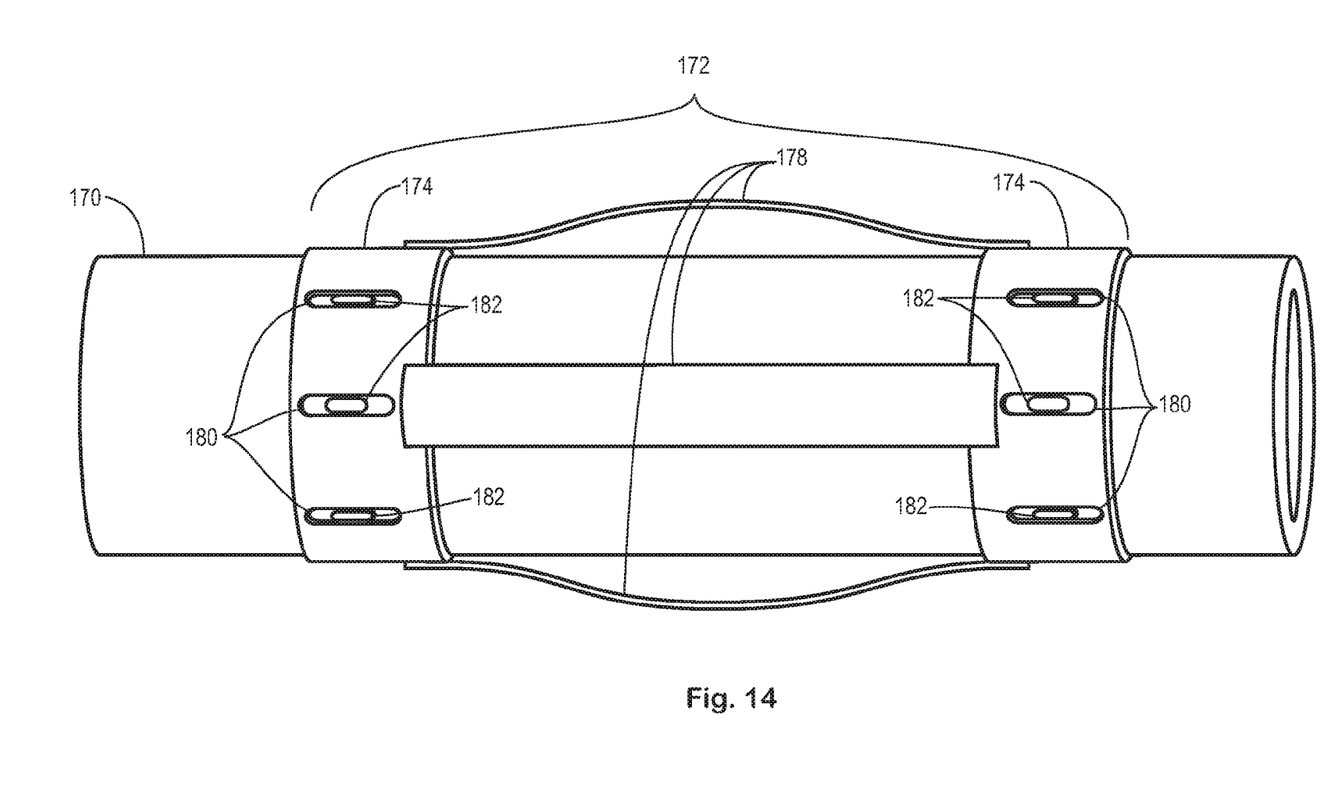
FIG. 14 is a side view drawing of a bore centralizer retained on an oilfield tubular according to an illustrative embodiment of the present invention.

Reference is directed to FIG. 14, which is a side view drawing of a bore centralizer 172 retained on an oilfield tubular 170 according to an illustrative embodiment of the present invention. Since the present invention provides for quite precise location and size of the near net shape deposits, there are unique opportunities to apply the technology in creative manners. FIG. 14 is a good example of this. A bore centralizer 172 is comprised of two sliding collars 174 that are connected by plural bow strings 178. Each of the collars 174 has plural lateral slots formed therethrough about their circumference. The centralizer 174 is slid onto the tubular 170, and then beads of deposits 180 are fused into the slots 182 using the teaching of the present invention. Note that the beads are not fused to the collars 174, rather they are fused to the tubular 170. Further, the beads are oriented to allow the collars 174 to slide laterally as the bows 178 flex. This is a novel arrangement made possible by the teachings of the present invention.

Figure 15:
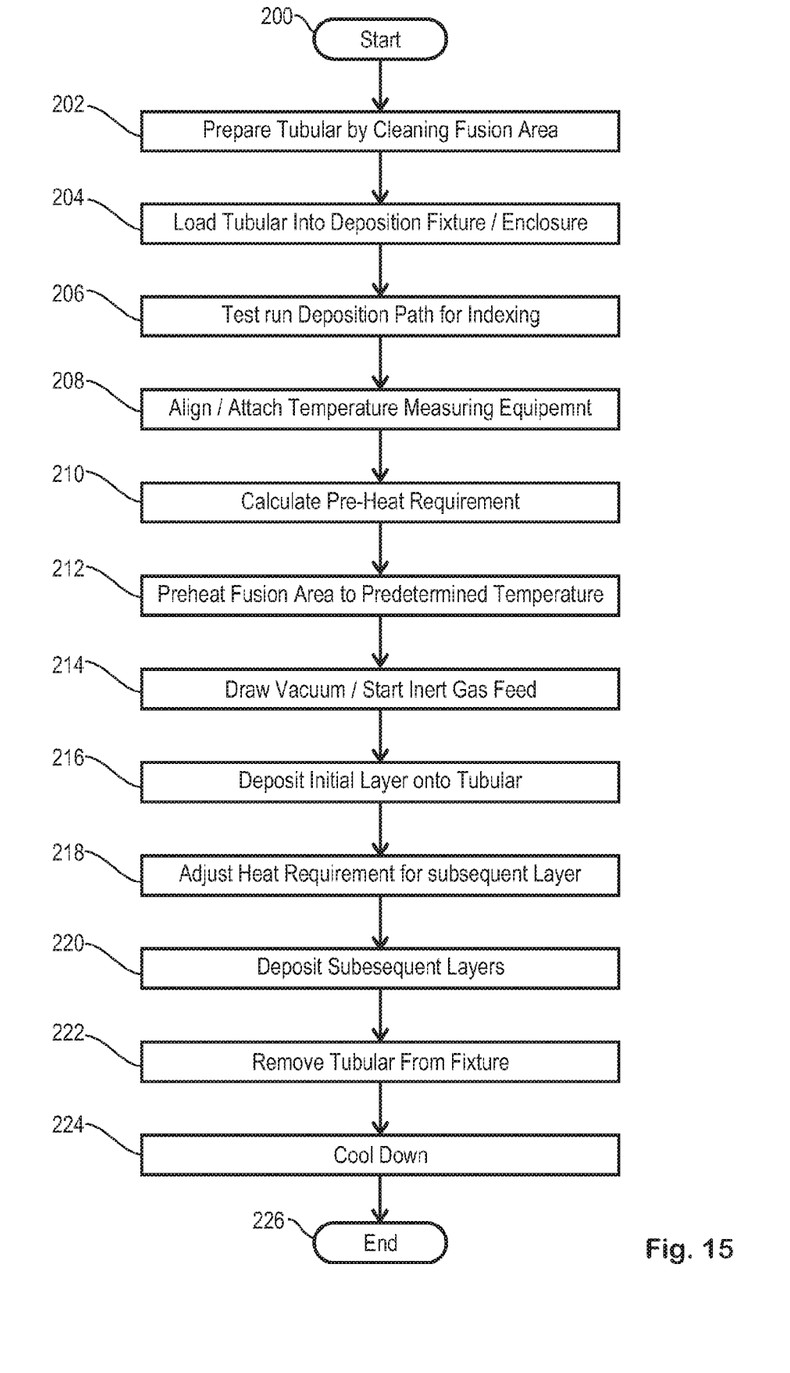
FIG. 15 is a process flow chart according to an illustrative embodiment of the present invention.

Reference is directed to FIG. 15, which is a process flow diagram according to an illustrative embodiment of the present invention. This diagram represents several variations of the processes of the present invention. The process begins at step 200 and proceeds to step 202 where the tubular is prepared for fusion. This involves cleaning the surface of the tubular in the fusion area. Note that it is not necessary to clean the entire surface of the tubular, just in the area where fusion is to occur. At step 204, the tubular is loaded into the deposition fixture so that it can be advanced relative to the feed point location. In the case of an electron beam energy source, this also includes loading the tubular into the vacuum chamber. Cranes, dollies, conveyors, and other sorts of transport machines known to those skilled in the art can be utilized to load the tubular.

At step 206, the deposition machinery is given a test run of the preprogrammed position and movement functions to confirm that the tubular is properly positioned and that the deposition path is accurate. At step 208, the testing and thermal measuring equipment and devices are positioned and aligned for the deposition run. At step 210, the pre heating requirements are calculated based on the size and materials of the tubular, the gauge and material of the feed wire, and the energy and movement rates planned for the deposition process. At step 212, the fusion area is preheated to the predetermined temperature, and this is confirmed using the thermal measuring devices. At step 214, the vacuum chamber is evacuated, or the gas is turned on, for the actual deposition run. Note that the order of this step may be changed as required.

At step 216, the initial layer of feed wire is deposited onto the fusion area of the tubular, with monitoring of heat and speeds to control depth of penetration of the fusion region. At step 218, the heat settings and speed are adjusted to accommodate the upper layers and the speed of the deposition processes for these layers. At step 220, the subsequent upper layers are deposited until the predetermined near net shape is produced. At step 222, the tubular is removed from the fixtures, and allowed to cool at step 224. The process is complete at step 226.

Thus, the present invention has been described herein with reference to a particular embodiment for a particular application. Those having ordinary skill in the art and access to the present teachings will recognize additional modifications, applications and embodiments within the scope thereof.

It is therefore intended by the appended claims to cover any and all such applications, modifications and embodiments within the scope of the present invention.

What is claimed is:

1. A method of layered material deposition to add a near net shape exterior member by fusion thereof onto a surface of a structural member having engineered parameters, including a maximum operating temperature, and without degrading structural performance thereof, comprising the steps of:
    defining a net shape of an exterior member, including a fusion area on the surface of the structural member;
    preheating the structural member about said fusion area to a temperature that is less than the maximum operating temperature of the structural member, and determined based on the structural member size and material;
    directing an energy beam and feeding the feedstock to a feed point within said fusion area, thereby forming a molten puddle fusing together feedstock material and material of the structural member;
    moving said feed point relative to the structural member, thereby advancing said molten puddle of presently fed feedstock and rapidly solidifying previously fed feedstock within a fusion region of liquefied and solidified metal thereby forming a first layer of feedstock material deposited on the fusion region;
    modulating power within said energy beam to control the size of said molten puddle so as not to exceed a predetermined depth of penetration of said fusion region into the structural member, which depth is calculated based upon the engineered parameters of the structural member;
    adjusting the energy beam power level on subsequent layers of feedstock deposited material as the molten puddle is positioned further away from the predetermined depth of penetration, and
    advancing said feed point, thereby sequentially fusing said feedstock, by action of the advancing molten puddle, into said defined net shape of said exterior member that is built-up upon said first layer of feedstock material on the surface of the structural member.

2. The method of claim 1, and wherein:
    said predetermined depth of penetration is specified so as to not materially diminish any of the engineered parameters.

3. The method of claim 1, and wherein:
    said predetermined depth of penetration is specified to be less than an allowable surface wear depth engineered parameter.

4. The method of claim 1, and wherein:
    said defining a net shape step defines said exterior member to be configured a plural fluid flow control vanes.

5. The method of claim 1, and wherein:
said directing an energy beam step is accomplished by selection of an electron beam or a laser beam.

6. The method of claim 1, and wherein:
said preheating step is accomplished using said energy beam as a heat source directed to said fusion area.

7. The method of claim 1, and wherein:
said preheating step is accomplished using an external induction heat source, by directing heat energy to said fusion area.

8. The method of claim 1, further comprising the step of:
selectively controlling the rate of feeding said feedstock to control the size of said molten puddle.

9. The method of claim 1, further comprising the step of:
selectively controlling the rate of advancing said feed point relative to said structural member to control the size of said molten puddle.

10. The method of claim 1, further comprising the step of:
scanning said energy beam in a predetermined pattern about said feed point.

11. The method of claim 10, and wherein:
said predetermined pattern is elliptical pattern that scrolls as said feed point is moved relative to said structural member.

12. The method of claim 10, and wherein:
said predetermined pattern overlaps the position of said feedstock, thereby pre-heating said feed stock prior to fusion.

13. The method of claim 10, and wherein:
said predetermined pattern is slightly larger than said molten puddle, thereby additionally pre-heating the structural member.

14. The method of claim 10, and wherein:
said scanning step occurs at a frequency of approximately two thousand cycles per second.

15. The method of claim 1, further comprising the step of:
changing to a second feedstock material during said advancing step.

16. The method of claim 1, further comprising the steps of:
monitoring the temperature of said fusion area, and
adjusting the power level of said energy beam in response thereto.

17. The method of claim 1, and wherein:
said advancing step is accomplished by rotating the structural member with respect to said feed point.

18. The method of claim 1, wherein the structural member is cylindrical, and wherein:
said advancing step is accomplished by moving said feed point radially and axially with respect to said structural member.

19. The method of claim 1, and wherein:
said advancing step is accomplished by moving said feed point orbitally about the structural member.

20. The method of claim 1, further comprising the step of:
evacuating the atmosphere within a sealed deposition chamber in which the structural member is positioned, thereby preventing oxidation of the fusion materials.

21. The method of claim 1, further comprising the step of:
dispersing an inert gas in said fusion area, thereby preventing oxidation of the fusion materials.

22. The method of claim 1 wherein the structural member is an oilfield tubular.

23. The method of claim 22, and wherein:
said exterior member is defined as a net shape that is an stop collar annularly disposed about the circumference of the tubular.

24. The method of claim 23, and wherein:
said stop collar is comprised of plural arcuate sections with spaces therebetween, thereby enabling fluids to readily flow past said stop collar.

25. The method of claim 1, wherein the structural member is an oilfield tubular, further comprising the steps of:
sliding a bore centralizer onto the tubular;
depositing a first stop collar on the exterior of the tubular adjacent to a first end of said centralizer;
depositing a second stop collar on the exterior of the tubular adjacent to a second end of said centralizer, and thereby
slidably and rotatably retaining said bore centralizer on said tubular between said first stop collar and said second stop collar.

26. The method of claims 1, wherein the structural member is an oilfield tubular, further comprising the steps of:
sliding a bore centralizer onto the tubular;
fixing said bore centralizer against rotation about the longitudinal axis of the tubular, and wherein
said advancing step is accomplished by rotating the tubular about its longitudinal axis, and wherein
said exterior member is an annular stop collar, and said feed point is positioned inside the length of said bore centralizer, thereby limiting lateral movement of said centralizer by said stop collar.

* * * * *